(12) United States Patent
Smith

(10) Patent No.: US 9,042,304 B2  
(45) Date of Patent: May 26, 2015

(54) CONTROLLING A PARAVIRTUALIZED WIRELESS INTERFACE FROM A GUEST VIRTUAL MACHINE

(71) Applicant: VMware, Inc., Palo Alto, CA (US)

(72) Inventor: Gregory A. Smith, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 70 days.

(21) Appl. No.: 13/905,900

(22) Filed: May 30, 2013

(65) Prior Publication Data

US 2013/0322335 A1 Dec. 5, 2013

Related U.S. Application Data

(60) Provisional application No. 61/655,872, filed on Jun. 5, 2012.

(51) Int. Cl.
```
H04W 4/00       (2009.01)
H04W 92/02      (2009.01)
H04L 29/06      (2006.01)
G06Q 30/00      (2012.01)
```

(52) U.S. Cl.  
CPC ............ *H04W 92/02* (2013.01); *H04L 69/08* (2013.01); *G06Q 30/01* (2013.01)

(58) Field of Classification Search  
CPC ........ G06Q 30/01; H04L 69/08; H04L 29/06; H04W 92/02  
USPC ................................................. 370/310, 328  
See application file for complete search history.

(56) References Cited

U.S. PATENT DOCUMENTS

| | | | |
|---|---|---|---|
| 7,478,173 B1 | 1/2009 | Delco | |
| 7,768,959 B1* | 8/2010 | Chen et al. | 370/328 |
| 8,254,381 B2* | 8/2012 | Allen et al. | 370/389 |
| 2005/0108315 A1* | 5/2005 | Singh et al. | 709/200 |
| 2007/0189308 A1* | 8/2007 | Tchigevsky et al. | 370/396 |
| 2008/0146178 A1* | 6/2008 | Lu et al. | 455/187.1 |
| 2011/0141124 A1* | 6/2011 | Halls et al. | 345/522 |
| 2013/0044759 A1* | 2/2013 | Reed et al. | 370/401 |

\* cited by examiner

*Primary Examiner* — Chi H Pham  
*Assistant Examiner* — Robert Lopata

(57) ABSTRACT

A method, system and an apparatus to paravirtualize a wireless interface is disclosed. In one embodiment, a method receives a frame of data for a wireless service through a wireless interface of a host device using a processor. If the frame of data is associated with a first type of category, the frame of data is processed through a first standard interface. If the frame of data is associated with a second type of category, the frame is processed through a second standard interface. The method then sends the frame of data processed through the first standard interface or the second standard interface to a guest. A virtual wireless interface associated the guest that is emulating the wireless interface of the host device converts the frame of data processed through the first standard interface to the second standard of communication.

20 Claims, 7 Drawing Sheets

CONTROLLING A PARAVIRTUALIZED WIRELESS INTERFACE FROM A GUEST VIRTUAL MACHINE

CROSS-REFERENCE TO RELATED APPLICATIONS

The present application claims priority to U.S. Provisional Patent Application No. 61/655,872 entitled "Controlling a Paravirtualized Wireless Interface from a Guest Virtual Machine" filed Jun. 5, 2012, the contents of which is incorporated herein by reference in its entirety.

BACKGROUND

A virtual machine (VM) is an abstraction of a physical computer that executes programs with some degree of isolation from the physical hardware and other VMs running on the same physical machine. This isolation is provided by virtualization software that runs on the physical machine that manages and abstracts out the physical resources for the VMs running on the system. The term "virtualization software" herein refers to all software logically interposed between a VM and the underlying hardware resources. Typically, this includes a kernel for managing host resources and for each VM, a virtual machine monitor (VMM) for presenting emulated resources for guest code execution. In addition to managing and abstracting system resources, the virtualization software can also impose policy restrictions on the virtual machine such as limiting where, when, and by whom the virtual machine can run, as well as limit access to the VM's information by encrypting the software and data stored by the virtual machine. Such policy and access restrictions for a VM are described in U.S. patent application Ser. No. 11/522,172 entitled, "Enforcing Restrictions Related to a Virtualized Computer Environment" and filed Sep. 14, 2006.

Software emulation is used for abstracting and sharing a physical LAN (non-wireless) network interface card (NIC) by a number of virtual machines running on a single computer system. In this case, a physical NIC is placed in "promiscuous mode," meaning that it will accept all network packets received, regardless as to whether they are addressed to the physical NIC or not. The packets are sent to a virtual network switch implemented by the virtualization software. The virtual network switch can then direct packets to destination virtual NICs assigned to any virtual machines on the system. The virtual NICs are software emulations of NIC devices and each of the virtual NICs has a unique MAC address that is distinct from each of the other virtual NICs and the physical NIC. In essence, the virtualization software implements a virtual network, connecting the virtual NICs with the physical NIC, which acts as a bridge or gateway to the outside world. It is also possible for the virtualization software to provide network address translation (NAT) capability.

In typical implementations of virtual networking devices, the physical NIC is controlled exclusively by the virtualization software. Guest virtual machines interact with the physical NIC only as a gateway or bridge through which to send network packets to the outside world. These packets typically conform to IEEE 802.3 (e.g., "Ethernet™") standards, which do not provide for a control path for the underlying device. That is, there is only a data path, and no control path, between the guest virtual machines and the physical device. Since wireless devices require additional user control (e.g., to select and authenticate to an access point), current implementations of device virtualization are not suitable for wireless devices. As a result, a user of the VM may not be able to take advantage of the wireless capabilities of a host device. For example, a user may not be able to select a wireless network through the interface provided by the guest operating system running inside the VM. In a managed VM, where access to the host operating system may be limited, this would lead to an inability to access wireless devices.

One approach to controlling devices generally includes using a peripheral component interconnect (PCI)-passthrough connection between a guest virtual machine and a physical address. In this case, the I/O (input/output) messages from the guest driver are communicated directly to and from the physical device on the host without any device emulation. This approach is simple to implement for any PCI device and provides a low-overhead mechanism (in terms of resource requirements) to provide a guest virtual machine with control over the device. However, because the host lacks visibility into the state of the physical device when it is controlled by a guest operating system, this approach prevents the host from serializing or deserializing the device's state, which is necessary for migrating the virtual machine or for taking virtual machine state checkpoints or snapshots. In addition, PCI-passthrough requires that guest physical memory pages (that is, memory pages viewed as physical memory by the guest operating system, but are redirected by the host virtualization software to actual physical memory) be pinned by the host so that the guest operating system cannot program the wireless device to write to a swapped out page of memory using direct memory access (DMA). If that were to happen, an IO-MMU page fault would occur, which is costly (in terms of performance) to recover from.

Another approach for controlling a PCI device is exemplified by the single root I/O virtualization (SR-IOV) specification developed by the industry consortium, peripheral Component Interconnect Special Interest Group (PCI-SIG). The SR-IOV specification provides for a physical device with built-in support for a plurality of virtual functions, each of which may be assigned to a different virtual machine and may be accessed directly by each virtual machine without any need for emulation by the virtualization layer. In this way, each SR-IOV compliant device can appear as many different devices. This approach requires an SR-IOV compliant device in order to implement, and such devices are not readily available, particularly for wireless communications in notebook or laptop computers.

SUMMARY

A method, system and an apparatus to paravirtualize a wireless interface is disclosed. In one embodiment, a method receives a frame of data for a wireless service through a wireless interface of a host device using a processor. If the frame of data is associated with a first type of category, the frame of data is processed through a first standard interface. If the frame of data is associated with a second type of category, the frame is processed through a second standard interface. The method then sends the frame of data processed through the first standard interface or the second standard interface to a guest. A virtual wireless interface associated the guest that is emulating the wireless interface of the host device converts the frame of data processed through the first standard interface to the second standard of communication.

BRIEF DESCRIPTION OF THE DRAWINGS

Example embodiments are illustrated by way of example and not a limitation in the figures of accompanying drawings, in which like references indicate similar elements and in which.

Other features of the present embodiments will be apparent from accompanying Drawings and from the Detailed Description that follows.

DETAILED DESCRIPTION

Figure 1:
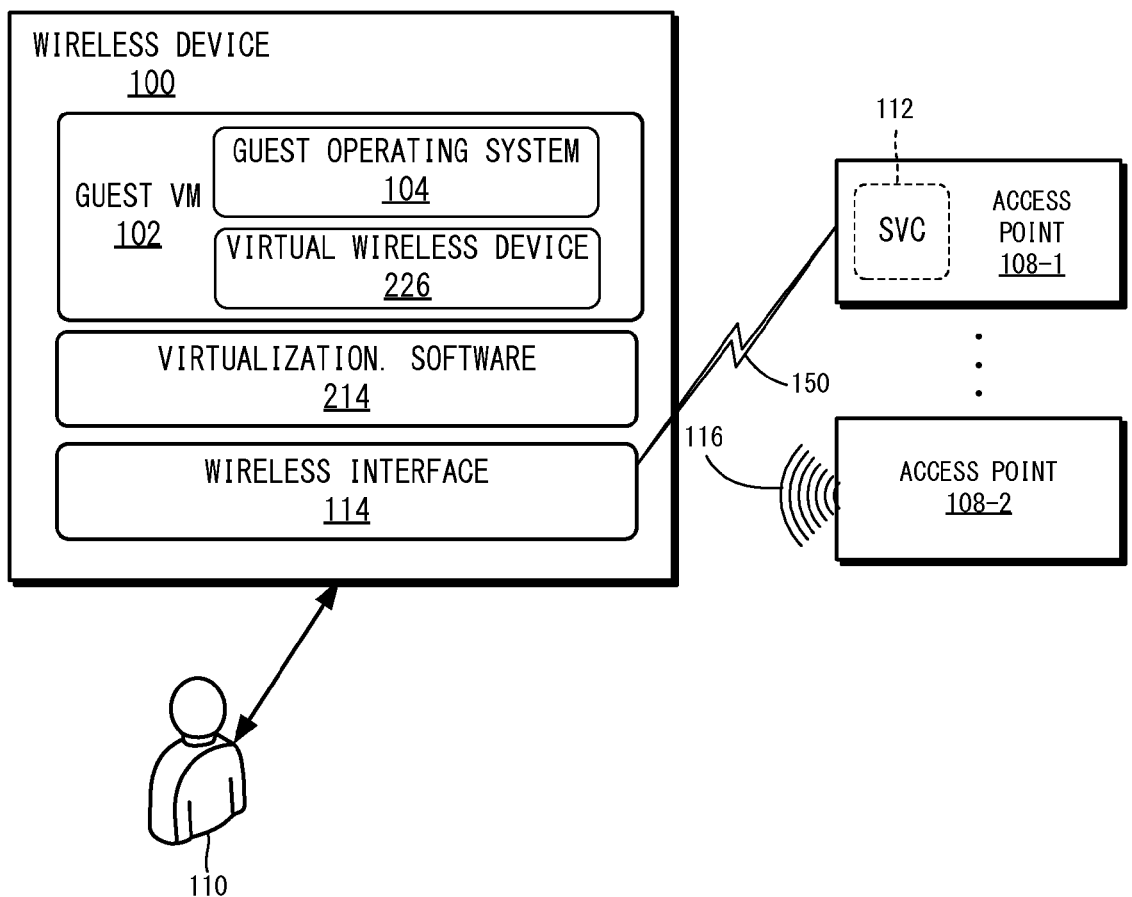
FIG. 1 is a network view of a host device having a wireless interface and a guest operating system communicating through the wireless interface, according to one embodiment.

Referring to FIG. 1, a user 110 operates wireless device 100 to access some service ("SVC") 112 located at wireless access point 108, which may be one of any number of wireless access points 108-1-108-2 (only two shown). Device 100 may be any computer system, such as a laptop with wireless connectivity or a hand-held mobile device. Device 100 includes virtualization software 214, which runs a guest virtual machine ("GUEST VM") 102. Software and certain internal hardware components of wireless device 100 are shown conceptually using boxes within wireless device 100. Wireless interface 114 may be software and hardware implementing a wireless standard such as IEEE 802.11 (e.g., Wi-Fi™), Blue-Tooth™, or the like, also referred to herein as a wireless local area network (WLAN). In one embodiment, device 100 may adhere to the IEEE 802.11 standard, and therefore may be capable of scanning for and identifying available access points 108 that are configured to advertise their presence, and access a particular available access point to form wireless connection 150 between device 100 and a user-selected access point 108, and therefore use service 112 provided at access point 108. For example, service 112 may include a network router that relays data between device 100 and other devices connected to a network (not shown) accessible by the router. Most digital wireless communications standards include some authentication mechanism whereby user 110 may authenticate himself/herself to access point 108 via presentation of some shared secret such as a password or certificate, or representation thereof. Typical commodity operating systems, of which guest operating system 104 may be one, include an authentication module (not shown in FIG. 1) for authenticating the user to a wireless access point 108, e.g., in accordance with the Wi-Fi Protected Access (WPA or WPA2) standards, or more broadly, IEEE 802.1X. Using the user interface presented to user 110 by guest operating system 104, user 110 may authenticate himself/herself to access point 108 in order to access wireless service 112.

In one embodiment, user 110 is restricted by virtualization software 214 from interfacing with device 100 except through the user interface (UI) (not shown) exported by guest operating system 104. Thus, in this embodiment, user 110 must accesses a UI provided by GOS 104 to control wireless interface 114. An implementation of this embodiment may be a Client Virtualization Platform (CVP). CVP devices enable an end user to run a virtualized desktop environment on a host device, with minimal or no interaction with the host operating system or host kernel, or applications running directly thereon. CVP technology is envisioned to allow enterprises to manage virtualized desktops that run on distributed hardware (i.e., on user laptops or desktops computers) without the burden of managing (and licensing, where the host operating system is open (such as a Linux® or BSD® distribution) both the VM and a host operating system.

Figure 2:
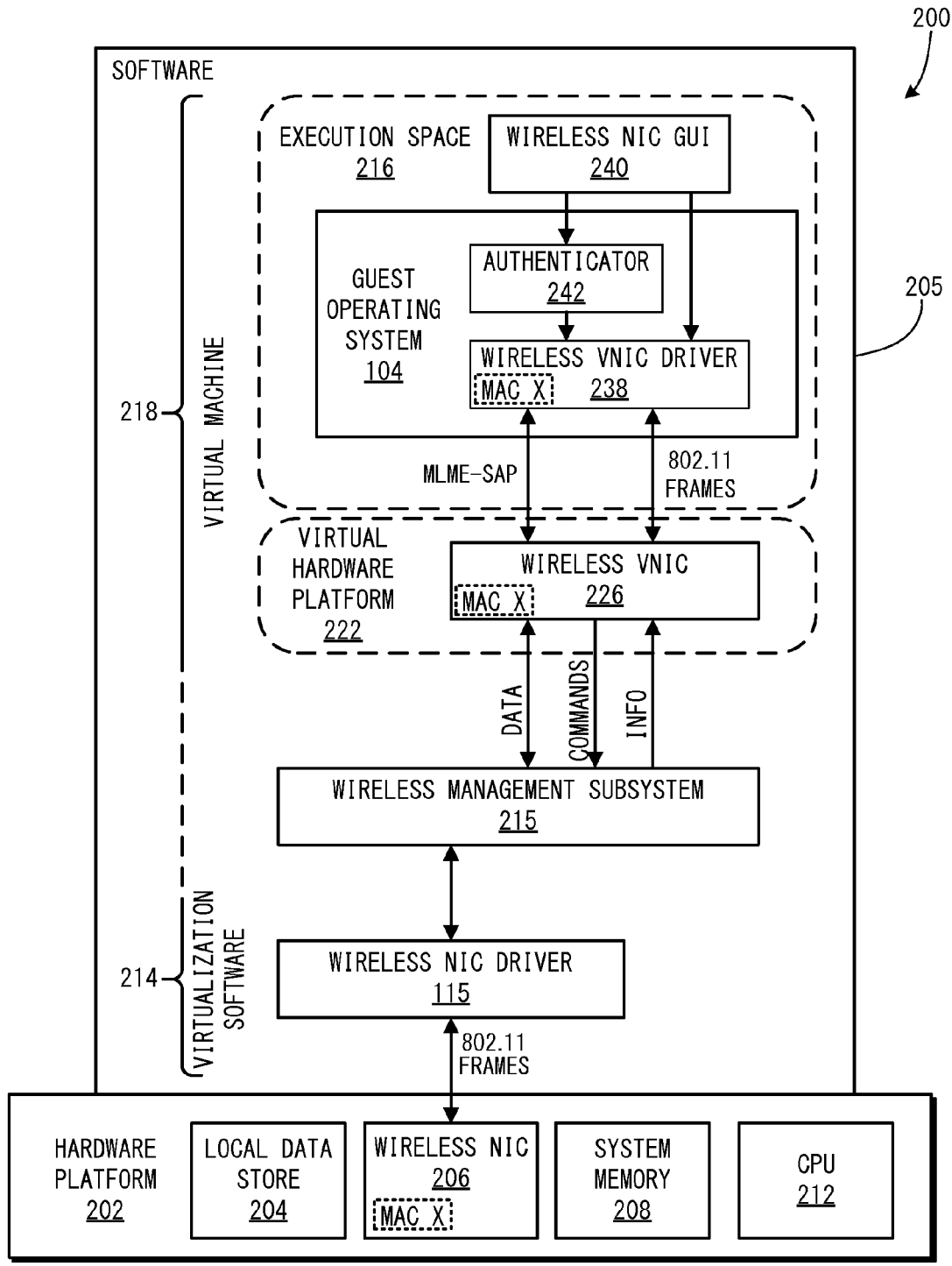
FIG. 2 is a block diagram of a driver VM-based virtualized computer system, according to one embodiment.

FIG. 2 depicts a block diagram of an exemplary virtualized computer system 200. Hardware platform 202 includes the physical resources of computer system 200, and may include local data store 204, such as a hard drive, wireless NIC 206, system memory 208, and CPU 212. System memory 208 may include a plurality of memories, such as random access and persistent mass storage devices. The term, "NIC" is used in its generic sense to refer to a network interface device, which may be integrated with other components such as the motherboard (not shown) of the hardware platform 202. A "wireless NIC" is a network interface device that communicatively connects to another wireless device (thereby forming a communications network) without wires. A common standard of wireless connectivity is the IEEE 802.11 standard, although wireless NIC should not be construed as being restricted to only that standard.

Software 205 resides in system memory 208, but is shown conceptually in FIG. 2 as being installed "on" hardware platform 202. Software 205 includes virtualization software 214 and virtual machine 218. Other software may be installed as well, including additional virtual machines, but is not shown so as not to obscure salient features relevant to this description. FIG. 2 is ambiguous as to the dividing line between virtualization software 214 and virtual machine, since wireless management subsystem 215 can be a component of either, or distributed between the two, in various embodiments.

Virtualization software 214 nominally includes system level software (not distinctly shown) for performing a variety of functions such as resource management and allocation to client processes and provision of execution environment for applications, along with system application programming interfaces (APIs) for providing access, through the system level software, to client processes. Virtualization software 214 may be implemented using a non-hosted (Type 1) or hosted (Type 2) hypervisor (not shown). The host operating system includes a kernel for managing system resources, including memory, processor, and devices. A non-hosted hypervisor relies on a kernel (sometimes referred to as a "VM kernel") that is purpose-built for supporting virtual machines. One example of a non-hosted hypervisor is embodied in the vSphere Hypervisor™ available from VMware, Inc. of Palo Alto, Calif.

In one implementation, a host operating system (not shown) is provided but is hidden from or otherwise not directly accessible by the user, such that the user can only interact with the guest operating system and whatever resources the hypervisor makes available to the guest operating system. This implementation allows policy controls to be "wrapped around" the virtual machine, to ensure that the VM is only accessed in accordance with whatever policy the owner of the VM (e.g., an enterprise) allows. Such policies may be enforced in a manner similar to that described in U.S. patent application Ser. No. 11/522,172, filed Sep. 14, 2006.

Virtualization software 214 supports virtual machine 218 having execution space 216 within which guest system software may be installed and executed. The guest system software may include guest operating system 104, which may be any commodity operating system such as Microsoft Windows®, Linux®, Solaris® x86, NetWare®, etc. Although only one virtual machine ("VM") 218 is shown, any number of VMs 218 may be supported by virtualization software 114. For each VM 218, virtualization software 214 includes a virtual machine monitor (VMM) (not shown) that provides emulated hardware such as a virtual hard drive (not shown), guest physical RAM (not shown), virtual CPU (not shown), and wireless virtual NIC ("wireless VNIC") 226.

Although typically implemented by the VMM portion of virtualization software 214, virtual hardware platform 222 is shown as part of VM 218 since, conceptually, the virtual hardware is often considered part of the VM. Guest operating system 104 includes a wireless VNIC driver 238 that interacts with emulated devices (e.g., wireless VNIC 226) in virtual hardware platform 222 as if such emulated devices were actual physical devices, despite the fact that, being "virtual," wireless VNIC 226 is implemented entirely or primarily in software.

Guest operating system 104 includes an authentication module (authenticator) 242 that includes software routines for authenticating user 110 (FIG. 1) to an access point 108. However, it should be recognized that wireless NIC 206, which resides in the hardware platform 202, is the entity that is authenticated to the remote access point 108, not wireless VNIC 226. Since wireless NIC 206 cannot be directly controlled by wireless VNIC driver 238, guest operating system 104, and hence authentication module 242 may not be capable of interacting directly with wireless NIC 206 to perform authentication routines.

In one embodiment, wireless management subsystem 215 is integrated with wireless VNIC 226. In another embodiment, wireless management subsystem 215 is implemented as a component of virtualization software 214, as further described, by way of example, in FIG. 3 below.

Figure 3:
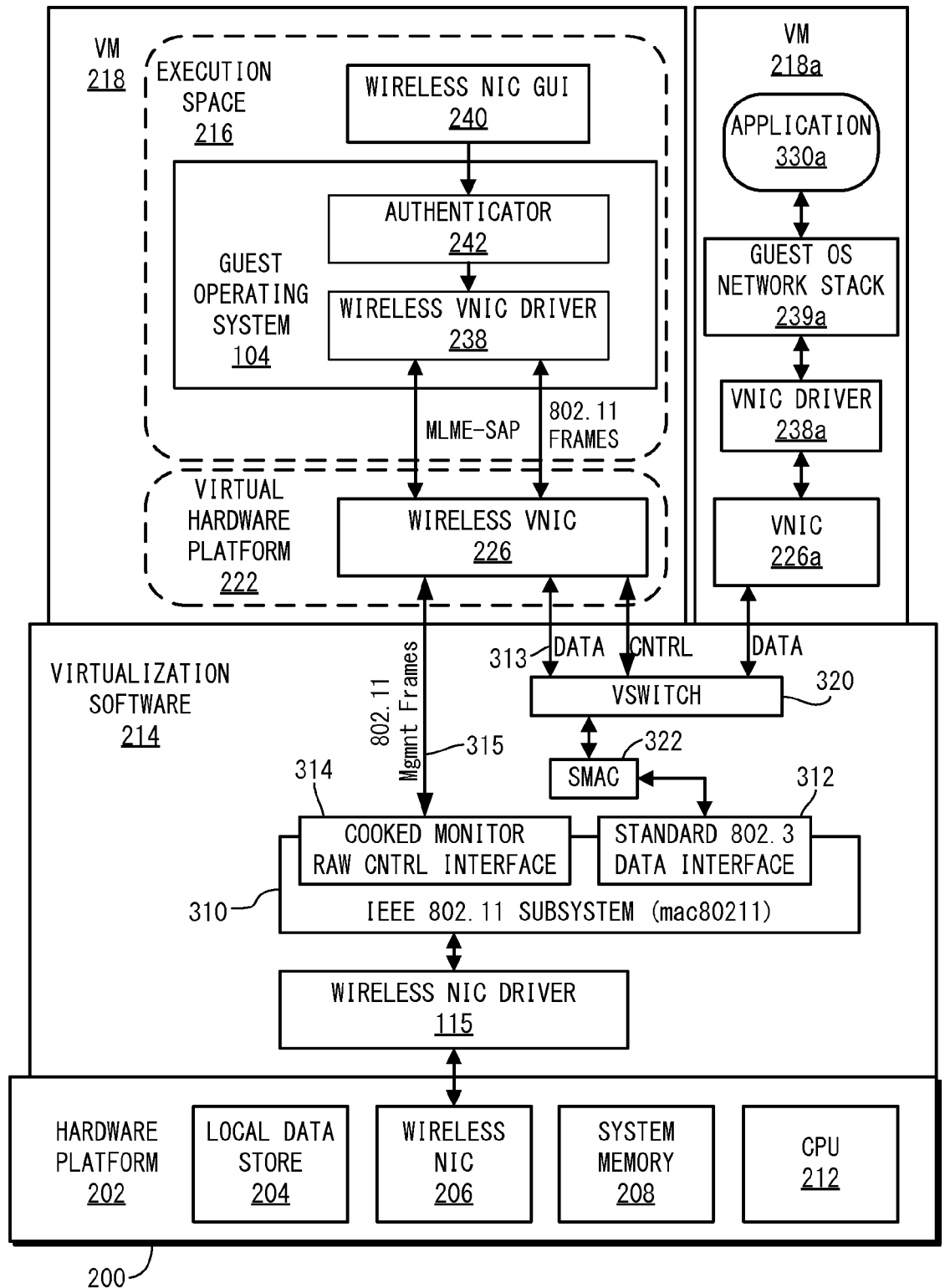
FIG. 3 shows an exemplary implementation of a system having a guest-controlled wireless interface, according to one embodiment.

FIG. 3 shows an exemplary implementation of a system having a guest-controlled wireless interface in which the host operating system is a Linux® operating system although the principles described with reference to FIG. 3 may be applied in an analogous manner to other operating systems. Virtualization software 214 comprises a host operating system (not separately shown) and an instance of a virtual machine monitor (not separately shown) for each virtual machine 218, 218a. Although only two virtual machines are shown, any number of virtual machines may be running concurrently on hardware platform 202, limited only by available system resources such as processor bandwidth and memory.

The host operating system includes an IEEE 802.11 subsystem 310 (hereinafter, "subsystem 310"). For the Linux operating system, subsystem 310 is known as "mac80211." Subsystem 310 includes a plurality of interfaces or APIs, including standard 802.3 data interface 312 (hereinafter, "standard interface 312") as well as what is known as cooked raw control monitor interface 314. Standard interface 312 is capable of interacting with any networking application that works with standard 802.3 packets. The standard 802.3 may be a wired standard defining the physical layer and data link layer's media access control (MAC) of wired Ethernet. Network data is passed from a guest application (not shown) in VM 218 to wireless VNIC driver 238, to wireless VNIC 226, to virtual switch ("VSWITCH") 320. Network frames bound for VM 218 travel from virtual switch 320 to wireless VNIC 226 and to guest operating system 104. Similarly, network traffic can travel to and from virtual machine 218a in a similar manner, from 802.3 application 330a to VNIC driver 238a, to VNIC 226a, and on to virtual switch 320.

Virtual switch 320 operates in a manner similar to that of physical switches by routing network traffic between virtual machines 218, 218a and wireless NIC 206. In one embodiment, virtual switch 320 is implemented as described in U.S. Pat. No. 7,478,173, which issued to Matthew Delco on Jan. 13, 2009. In another embodiment, the virtual switch is not used. In an embodiment that has no virtual switch, either only one VM may be supported, or multiple VMs in which traffic from one VM to the other is looped back at the wireless router or access point 108.

In the data link layer of computer networks, each connected device includes a data link address that is typically unique to each device on the network. For Ethernet networks, this address is referred to as the media access control, or MAC address. Each network packet includes both a source MAC address, that is, the MAC address of the sender of the network packet, and a destination MAC address, that is, the MAC address of the intended recipient. Physical wireless NIC 206 is assigned a MAC address by its manufacturer and is generally intended to be globally unique to the device. Software or virtual NIC devices such as wireless VNICs 226, 226a can be assigned any MAC address by software. However, it is still important that each device on the network, including virtual devices, have a unique MAC address for the network protocols to function. However, for authentication purposes, as described below, wireless VNIC 226—the VNIC that is assigned to the VM that exercises management control over wireless NIC 115—may be assigned the same MAC address as wireless NIC 206. For data traffic, wireless VNIC 226 is a pass-through device that sends packets from the guest's network stack (not shown) through to wireless NIC driver 115 (through subsystem 310 and optionally through virtual switch 320 and SMAC interface 322), without modification. As will be described in more detail below, this configuration allows authentication module 242 to authenticate wireless NIC driver 115 to access point 108.

In one embodiment, virtual switch 320 (if present) is connected to SMAC interface 322. Because wireless NIC driver 115 expects to send and receive packets with a consistent local MAC address, SMAC interface 322 substitutes the MAC address of VNIC 226a with the MAC address of wireless NIC 206 for outgoing frames and vice versa for incoming. More details of the operation of SMAC interface 322 are described in the above referenced U.S. Pat. No. 7,478,173, where SMAC interface 322 is described in the referenced patent as "virtual network connector" or a "mapping unit." SMAC interface 322 is in communication between virtual switch 320 and standard data interface 312, and effectively makes virtual switch 320 appear as user-level network application to subsystem 310.

Wireless NIC driver 115 receives three types of packets from VMs 218, 218a. The first type of packet is referred to as "data packets," which include packets destined for transmission to access point 108 (FIG. 1). The second type of packet is referred to herein as "control packets," which are packets that control which VM can send packets to wireless NIC 206. "Management packets" contain instructions or information related to management operations of wireless NIC 206. These management operations include connection setup information, such as information for scanning for access points, selecting an access point, etc.

Wireless operations of wireless NIC driver 115, such as scanning for access points, selecting access point, etc., can be implemented as system software for controlling the wireless operations of wireless NIC driver 115. For example, a standard web browser can interact with the 802.3 interface for sending and receiving network data in the same way it would for any non-wireless NIC.

In the context of the host operating system, a typical user application (not shown) may interact with standard 802.3 interface 312 to send and receive network data. Also, control packets are sent through standard 802.3 interface 312 to control which VM controls wireless NIC 206. Furthermore, 802.11 management packets may be sent and received to perform management operations on wireless NIC 206 through cooked monitor raw control interface 314. As earlier described, such management operations can include scanning and listing available access points and selecting an available access point. Hence, standard 802.3 provides both a data and control path between user and system applications running on the host operating system and wireless NIC driver 115 and standard 802.11 provides a management path between user and system applications running on the host operating system and wireless NIC driver 115.

In the embodiment of FIG. 3, a division of flow paths is provided by the use of both the standard 802.3 data interface and cooked monitor raw control interfaces 312, 314. Standard 802.3 data interface 312 provides a data and control path 313 to wireless VNIC 226, which interacts with IEEE 802.11 subsystem via standard 802.3 data interface as would any application host user application. In operation, subsystem 310 receives raw packets from wireless NIC driver 115 and processes them for presentation to higher components. For example, subsystem 310 may be responsible for decrypting 802.11 packets, reassembling split packets, and hardware-offloading, to provide compatible 802.3 packets via standard 802.3 data interface 312. The compatible 802.3 packets and standard interface 312 are usable by any compliant application or library, i.e., applications and libraries that have no special programming for wireless networking, but understand only traditional LAN-based Ethernet protocol. Cooked monitor raw control interface 314 is used for management operations. For example, management frames in standard 802.11 is used in the connection set up with access point 108. These frames do not need to be converted by subsystem 310 and are sent through cooked monitor raw control interface 314.

Figure 4A:
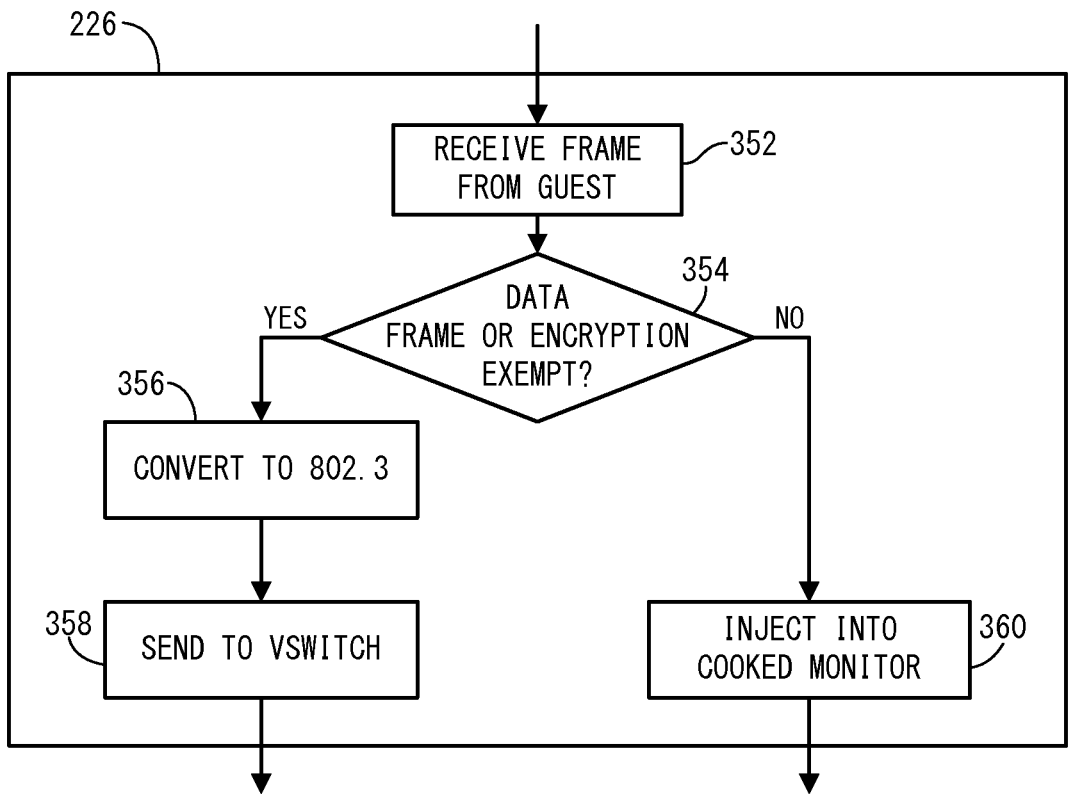
FIG. 4A depicts a simplified flowchart of a method for transmitting frames in wireless VNIC 226 according to one embodiment.

FIG. 4A depicts a simplified flowchart of a method for transmitting frames in wireless VNIC 226 according to one embodiment. At 352, wireless VNIC 226 receives a frame from a guest. At 354, wireless VNIC 226 determines if the frame is encryption exempt. For example, data sent in 802.3 packets should be encrypted. If the frame is encryption exempt, at 360, the frame is injected into cooked monitor raw control interface 314 via 802.11 packets.

If the frame is not encryption exempt, then at 356, the frame is converted to 802.3 packets. This encrypts the frame per the 802.3 standard. At 358, the packets are sent to VSwitch 320.

Figure 4B:
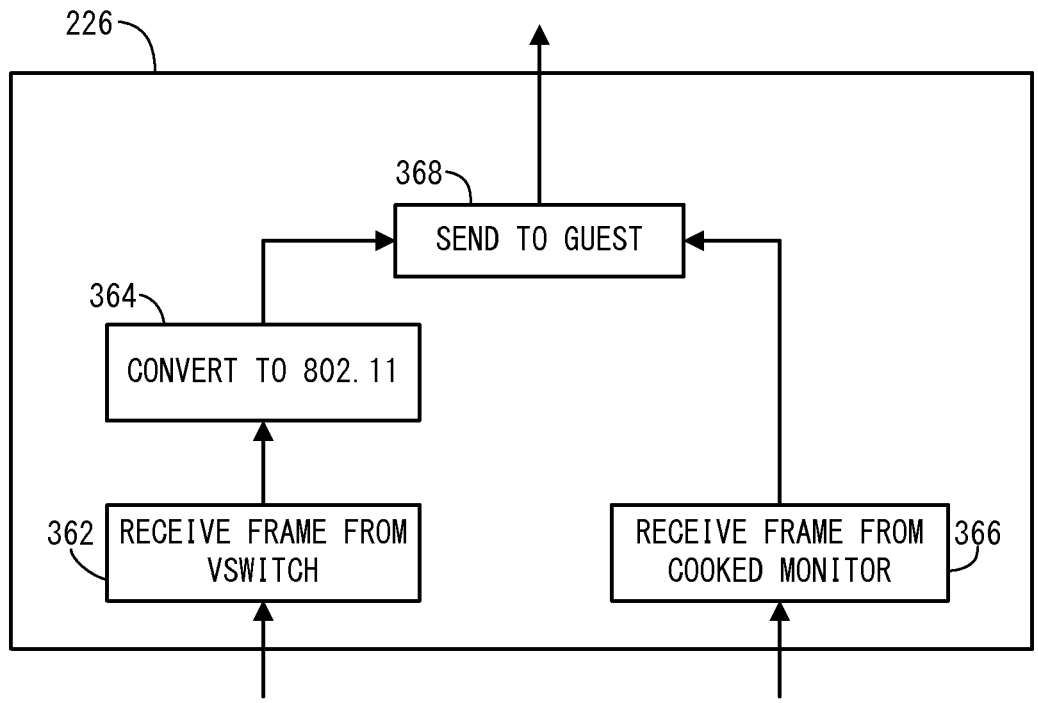
FIG. 4B depicts a simplified flowchart of a method for receiving frames in wireless VNIC 226 according to one embodiment.

FIG. 4B depicts a simplified flowchart of a method for receiving frames in wireless VNIC 226 according to one embodiment. At 362, wireless VNIC 226 receives a frame from VSwitch 320. At 364, wireless VNIC 226 converts the frame to 802.11 packets. In one example, 802.3 data is received and converted into 802.11 packets. At 366, a frame is received from cooked monitor raw control interface 314. The frame is in the 802.11 format and thus no conversion is necessary. At 368, the 802.11 packets from 362 or 424 are sent to the guest.

Referring back to FIG. 3, wireless VNIC 226 is assigned the same MAC address ("MAC X") as physical wireless NIC 206 so that authentication with a wireless access point such as access point 108 can be performed by authentication module 242 in guest OS 104. In one embodiment, the guest VNIC is given a virtual MAC, and the hardware NIC has a physical MAC.

In another embodiment, multiple virtual machines 218 of the computer system 200 may access the physical wireless device 206. Virtual machine 218 may configure physical wireless device 206. The other virtual machines 218 may access physical wireless device 206 based on that configuration. Only one VM 218 may be assigned a physical access point 108. Other VMs 218 that are not currently assigned physical access points 108 are assigned "fake" access points 108. For example, access points 108 are emulated and assigned to other VMs 218 such that these VMs 218 believe they are connected to an access point 108.

Guest operating system 104 may include different states, such as roaming and connected states, according to one embodiment. A state machine, which may be managed by a guest driver, may have different states. The states may include a disconnected state, a roam wait state, a connecting state, a roaming state, and a connected state. The state machine may shift between the different states.

The disconnected state may be when the guest driver is deauthenticated and disassociated from the access point. The roam wait state may be when the guest driver is deauthenticated and disassociated from the access point and/or a roaming attempt is pending. The connecting state may be when the guest driver is attempting to authenticate and associate with the access point. The roaming state may be when the guest driver is attempting to authenticate and associate as part of a roaming attempt. The connected state may be when the guest driver and the access point are authenticated and/or associated.

Figure 5:
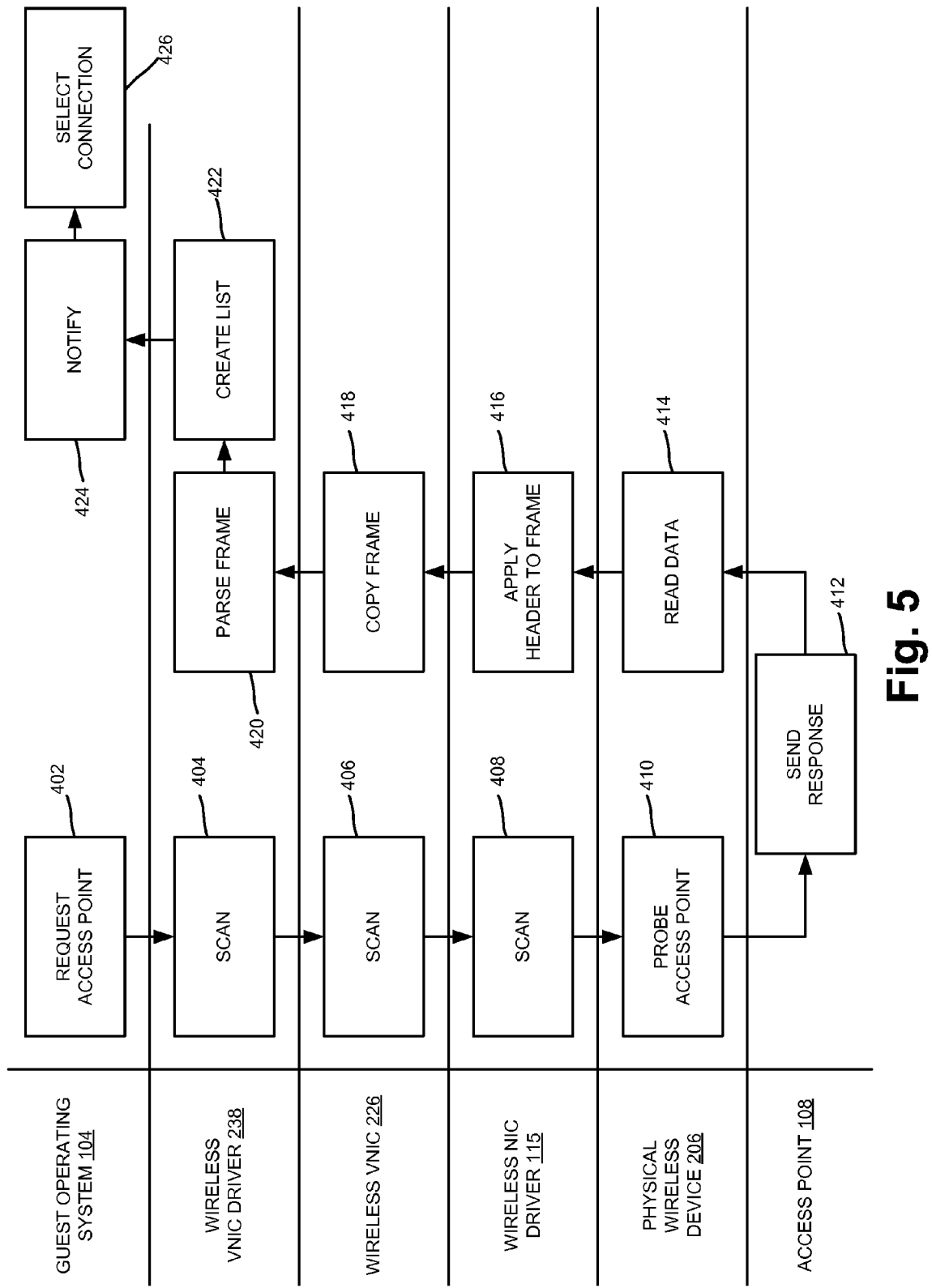
FIG. 5 is a process flow diagram of a paravirtualization of a wireless interface according to one embodiment.

FIG. 5 is a process flow diagram of a paravirtualization of a wireless interface according to one embodiment. The following allows a user to scan for access points. User 110 through a user interface of guest operating system 104 requests a connection to a wireless network through an access point 108 in operation 402. The request to scan for an access point 108 is passed to virtual wireless VNIC driver 238 in operation 404. The scan request is passed to wireless VNIC 226 in operation 406. The scan request is passed to wireless NIC driver 115 in operation 408. Physical wireless device 206 probes an access point 108 in operation 410.

Based on a probe of physical wireless device 206, access point 108 sends a response to physical wireless device 206 in operation 412. Physical wireless device 206 reads the data from access point 108 in operation 414. Wireless NIC driver 115 applies a header to a frame in operation 416. Wireless VNIC 226 copies the frame in operation 418. Virtual wireless driver 238 parses the frame in operation 420. Virtual wireless driver 238 creates a list of access points $108_{1-N}$ available for connecting in operation 422. Guest operating system 104 notifies a user 110 of the available access points $108_{1-N}$ in operation 424. A user 110 through a user interface of guest operating system 104 can select an access point 108 based on a wireless signal 116 (FIG. 1) of access point 108.

Figure 6:
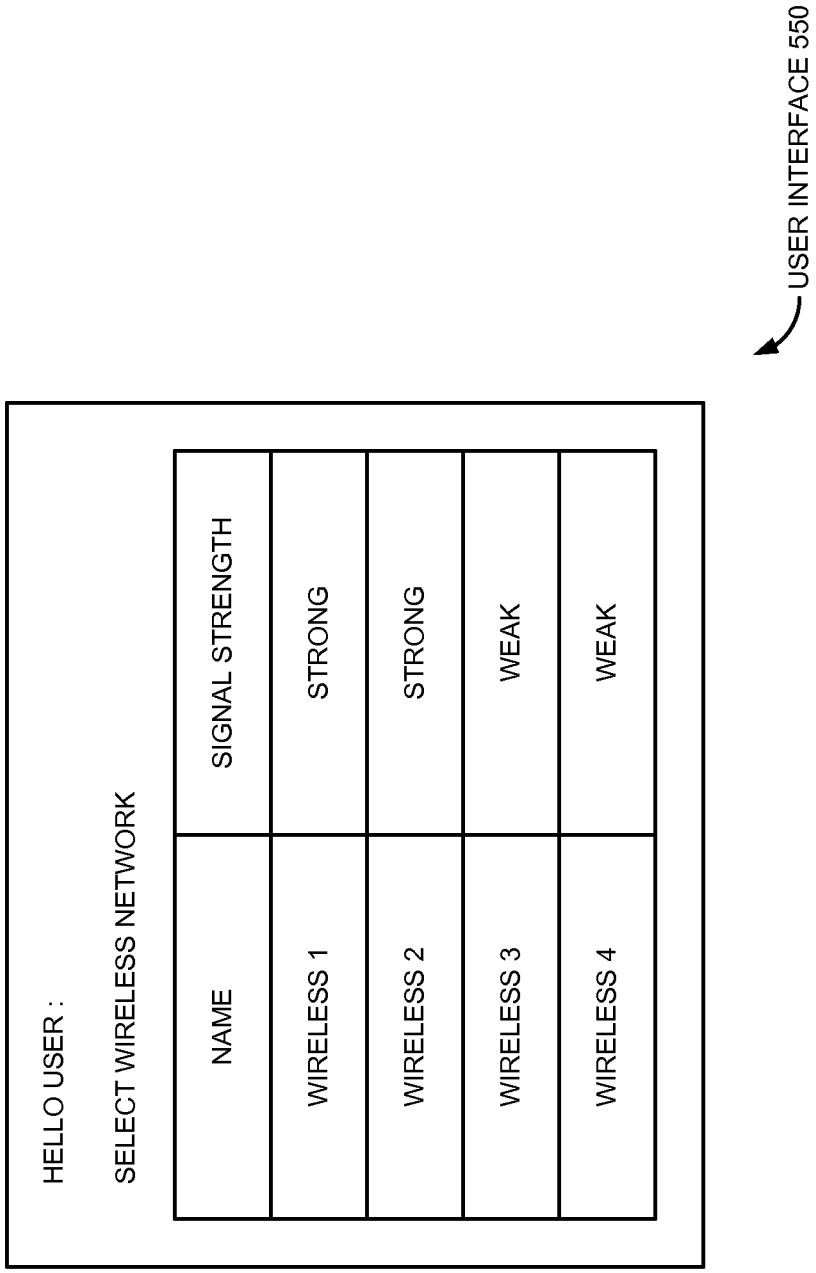
FIG. 6 is a user interface view of the guest operating system to select a wireless network, according to one embodiment.

FIG. 6 is a user interface 550 view of the guest operating system 104 to select a wireless network. User interface 550 may provide a list of wireless networks available for connection based on a wireless signal 116 (FIG. 1) of access point 108. Additional information such as signal strength may be presented to the user. The user may be prompted to select a wireless network. Based on the selection of the wireless network, the wireless NIC driver 115 (e.g., wireless interface) may be configured through the guest operating system 104.

Figure 7:
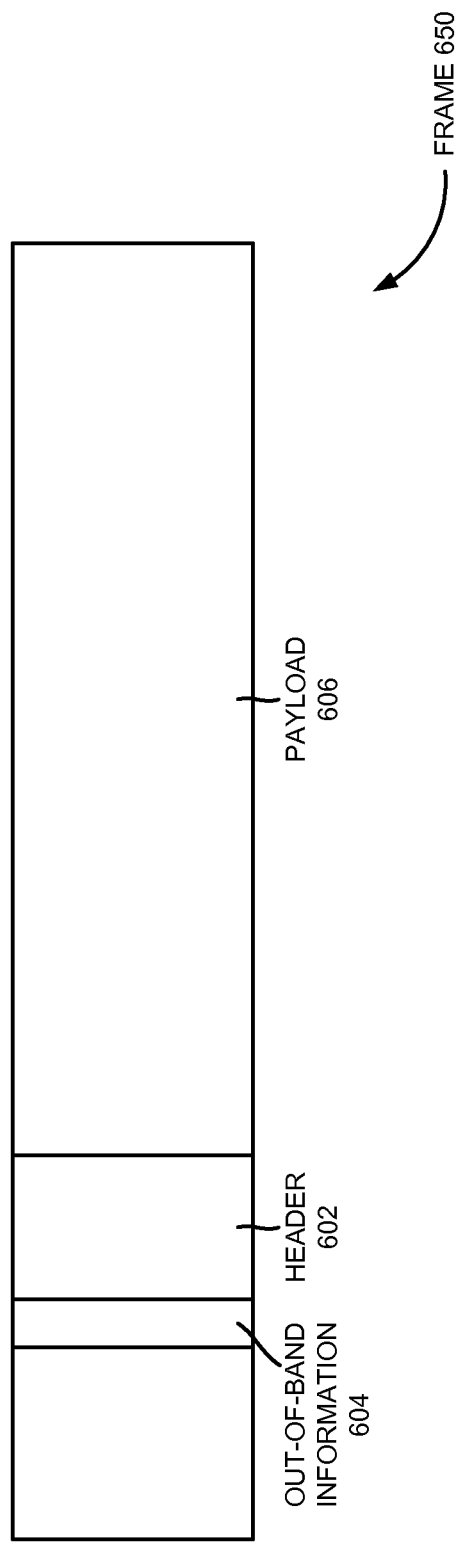
FIG. 7 is a frame having a header with out-of-band information, according to one embodiment.

FIG. 7 is a frame 650 with out-of-band information 604 in the header 602. Out of band information may be used to control the packet processed for transmitted frames (e.g., encryption). Out of band information also may be used to provide additional metadata about received frames (e.g., antenna frequency, was encryption performed, and signal strength). Signal strength indicated how strong the signals are received from different access points 108. A header 602 comprising out of band information 604 may be applied to frame 650 through wireless NIC driver 115. Virtual wireless driver 238 may parse frame 650 comprising header 602. The header may be augmented to include out of band information such as signal strength.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C#, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network. One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

What is claimed:

1. A method comprising:
  receiving a frame of data for a wireless service through a wireless interface of a host device using a processor;
  if the frame of data is associated with a first type of category, processing the frame of data through a first standard interface associated with a first standard of communication;
  if the frame of data is associated with a second type of category, processing the frame through a second standard interface associated with a second standard of communication; and
  sending the frame of data processed through the first standard interface or the second standard interface to a guest running on the host device, wherein a virtual wireless interface associated the guest that is emulating the wireless interface of the host device converts the frame of data processed through the first standard interface to the second standard of communication.

2. The method of claim 1 wherein:
  the guest is a virtual machine, and
  the wireless interface is a wireless network interface controller.

3. The method of claim 1 wherein:
  the first type of category comprises one of a data frame and a control frame, and the second type of category comprises a management frame.

4. The method of claim 3 wherein the data frame transmits data, the management frame includes data for connecting the guest to the wireless interface, and the control frame includes data for controlling which guest can communicate with the wireless interface.

5. The method of claim 1 wherein the first standard comprises a wireless standard for sending data and the second standard comprises a wired standard for sending data.

6. The method of claim 1 wherein:
the frame of data processed through a first standard interface is encrypted, and
the frame of data processed through a second standard interface is not encrypted.

7. The method of claim 1 further comprising:
receiving a selection of the wireless service though a user interface of the guest such that a response to a request of the user interface controls a selection of the wireless service;
authenticating the guest of the host device with the wireless service though the user interface of the guest such that the response to the request of the user interface controls an authentication of the wireless service; and
configuring the wireless interface of the host device through the guest such that the selection of the wireless service and the authentication of the guest with the wireless service are controlled through the user interface of the guest.

8. The method of claim 1 further comprising:
processing an out-of-band information, wherein the out-of-band information comprises one of a signal strength, a data rate, a channel, and a media access control protocol data unit fragment; and
inserting a header based on the out-of-band information to the frame of data to convey the out-of-band information to the guest.

9. The method of claim 1 further comprising assigning a media access control address to the guest, wherein the media access control address of the guest is the same as the media access control address of the wireless interface of the host.

10. The method of claim 1 further comprising:
scanning across a frequency such that the frequency provides access to the wireless service;
locating a list of access points based on the frequency, wherein the access points permits the wireless interface to connect to the wireless network;
providing the list of access points to the guest; and
receiving a selection of an access point in the list of access points from the guest, wherein the guest configures the wireless interface of the host device.

11. The method of claim 10 wherein:
multiple guests can configure the wireless interface of the host device,
when the guest configures the wireless interface of the host device, other guests are assigned virtual wireless interfaces that emulate wireless interfaces of the host device that are not real,
when another guest configured the wireless interface of the host device, the another guest is assigned the wireless interface and the guest is assigned a virtual wireless interface that emulates a wireless interface of the host device that is not real.

12. A non-transitory computer-readable storage medium containing instructions for controlling a computer system to be configured for:

receiving a frame of data for a wireless service through a wireless interface of a host device using a processor;
if the frame of data is associated with a first type of category, processing the frame of data through a first standard interface associated with a first standard of communication;
if the frame of data is associated with a second type of category, processing the frame through a second standard interface associated with a second standard of communication; and
sending the frame of data processed through the first standard interface or the second standard interface to a guest running on the host device, wherein a virtual wireless interface associated the guest that is emulating the wireless interface of the host device converts the frame of data processed through the first standard interface to the second standard of communication.

13. The non-transitory computer-readable storage medium of claim 12 wherein:
the first type of category comprises one of a data frame and a control frame, and
the second type of category comprises a management frame.

14. The non-transitory computer-readable storage medium of claim 13 wherein the data frame transmits data, the management frame includes data for connecting the guest to the wireless interface, and the control frame includes data for controlling which guest can communicate with the wireless interface.

15. The non-transitory computer-readable storage medium of claim 12 wherein the first standard comprises a wireless standard for sending data and the second standard comprises a wired standard for sending data.

16. The non-transitory computer-readable storage medium of claim 12 wherein:
the frame of data processed through a first standard interface is encrypted, and
the frame of data processed through a second standard interface is not encrypted.

17. The non-transitory computer-readable storage medium of claim 12 further operable for: receiving a selection of the wireless service though a user interface of the guest such that a response to a request of the user interface controls a selection of the wireless service;
authenticating the guest of the host device with the wireless service though the user interface of the guest such that the response to the request of the user interface controls an authentication of the wireless service; and
configuring the wireless interface of the host device through the guest such that the selection of the wireless service and the authentication of the guest with the wireless service are controlled through the user interface of the guest.

18. The non-transitory computer-readable storage medium of claim 12 wherein:
multiple guests can configure the wireless interface of the host device,
when the guest configures the wireless interface of the host device, other guests are assigned virtual wireless interfaces that emulate wireless interfaces of the host device that are not real,
when another guest configured the wireless interface of the host device, the another guest is assigned the wireless interface and the guest is assigned a virtual wireless interface that emulates a wireless interface of the host device that is not real.

19. The non-transitory computer-readable storage medium of claim 12 further operable for assigning a media access control address to the guest, wherein the media access control address of the guest is the same as the media access control address of the wireless interface of the host.

20. An apparatus comprising:
- one or more computer processors; and
- a computer-readable storage medium comprising instructions for controlling the one or more computer processors to be operable for:
- receiving a frame of data for a wireless service through a wireless interface of a host device using a processor;
- if the frame of data is associated with a first type of category, processing the frame of data through a first standard interface associated with a first standard of communication;
- if the frame of data is associated with a second type of category, processing the frame through a second standard interface associated with a second standard of communication; and
- sending the frame of data processed through the first standard interface or the second standard interface to a guest running on the host device, wherein a virtual wireless interface associated the guest that is emulating the wireless interface of the host device converts the frame of data processed through the first standard interface to the second standard of communication.

\* \* \* \* \*